US010760311B2

(12) United States Patent
Regimbal et al.

(10) Patent No.: US 10,760,311 B2
(45) Date of Patent: Sep. 1, 2020

(54) INFORMATION HANDLING SYSTEM DUAL AXIS MONO-BARREL HINGE (71) Applicant: Dell Products L.P., Round Rock, TX (US)

(72) Inventors: Laurent A. Regimbal, Georgetown, TX (US); Anthony J. Sanchez, Pflugerville, TX (US)

(73) Assignee: Dell Products L.P., Round Rock, TX (US)

( * ) Notice: Subject to any disclaimer, the term of this patent is extended or adjusted under 35 U.S.C. 154(b) by 134 days.

(21) Appl. No.: 15/832,181

(22) Filed: Dec. 5, 2017

(65) Prior Publication Data
US 2019/0169896 A1 Jun. 6, 2019

(51) Int. Cl.
G06F 1/16 (2006.01)
E05D 7/04 (2006.01)
E05D 11/00 (2006.01)

(52) U.S. Cl.
CPC ............. *E05D 7/04* (2013.01); *G06F 1/1681* (2013.01); *G06F 1/1683* (2013.01); *E05D 11/0081* (2013.01); *E05Y 2900/606* (2013.01); *G06F 1/1618* (2013.01)

(58) Field of Classification Search
CPC .............................. G06F 1/1681; G06F 1/1683
See application file for complete search history.

(56) References Cited

U.S. PATENT DOCUMENTS

| 4,961,126 A * | 10/1990 | Suzuki | G06F 1/1616 16/223 |
| 5,394,297 A * | 2/1995 | Toedter | G06F 1/1616 16/386 |
| 5,566,048 A * | 10/1996 | Esterberg | G06F 1/1616 16/307 |
| 5,970,580 A * | 10/1999 | Katoh | G06F 1/1681 16/337 |
| 5,987,704 A * | 11/1999 | Tang | G06F 1/1681 16/342 |
| 6,223,393 B1 * | 5/2001 | Knopf | G06F 1/1618 16/366 |
| 6,253,419 B1 * | 7/2001 | Lu | G06F 1/1618 16/340 |
| 7,155,266 B2 * | 12/2006 | Stefansen | H04M 1/022 455/575.3 |
| 7,832,056 B2 * | 11/2010 | Kuwajima | H04M 1/022 16/282 |
| 8,248,764 B2 * | 8/2012 | Hassemer | H04M 1/022 361/679.01 |

(Continued)

*Primary Examiner* — Adrian S Wilson
(74) *Attorney, Agent, or Firm* — Zagorin Cave LLP; Robert W. Holland (57) ABSTRACT A dual axis hinge assembly couples first and second hinges to each other with a central barrel and routes cables across hinge axles with cable channels formed in the axles. The dual axis hinge assembly rotationally couples information handling system housing portions to each other and routes cables between the housing portions distal the barrel by running the cables through a channel formed in each axle of one of the hinges with the cable entering one axle distal the barrel, routing through the axle to a position proximate the barrel, crossing the hinge to enter the other hinge axle proximate the barrel and routing though the other axle to exit distal the barrel.

13 Claims, 9 Drawing Sheets (56) References Cited

U.S. PATENT DOCUMENTS

| | | | | |
|---|---|---|---|---|
| 8,441,791 | B2* | 5/2013 | Bohn | G06F 1/1681 |
| | | | | 16/286 |
| 8,593,800 | B2* | 11/2013 | Asakura | G06F 1/1616 |
| | | | | 16/235 |
| 8,773,849 | B2* | 7/2014 | Bohn | H04M 1/022 |
| | | | | 361/679.27 |
| 8,931,141 | B2* | 1/2015 | Chen | H04M 1/022 |
| | | | | 16/366 |
| 9,128,664 | B1* | 9/2015 | Tabone | G06F 1/1616 |
| 2004/0109286 | A1* | 6/2004 | Shin | G06F 1/1616 |
| | | | | 361/679.55 |
| 2004/0203994 | A1* | 10/2004 | Won | G06F 1/162 |
| | | | | 455/522 |
| 2005/0239520 | A1* | 10/2005 | Stefansen | H04M 1/022 |
| | | | | 455/575.1 |
| 2007/0101541 | A1* | 5/2007 | Yin | H04M 1/022 |
| | | | | 16/221 |
| 2009/0056073 | A1* | 3/2009 | Lin | G06F 1/1618 |
| | | | | 16/235 |
| 2011/0289726 | A1* | 12/2011 | Zhang | G06F 1/1681 |
| | | | | 16/250 |
| 2013/0187525 | A1* | 7/2013 | Chuang | G06F 1/1681 |
| | | | | 312/326 |
| 2015/0362958 | A1* | 12/2015 | Shang | G06F 1/1681 |
| | | | | 361/679.58 |
| 2017/0255231 | A1* | 9/2017 | Morrison | G06F 1/1616 |

* cited by examiner

INFORMATION HANDLING SYSTEM DUAL AXIS MONO-BARREL HINGE

BACKGROUND OF THE INVENTION

Field of the Invention

The present invention relates in general to the field of information handling system rotationally-coupled components, and more particularly to an information handling system dual axis mono-barrel hinge.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Portable information handling systems process information with processing components integrated in a portable housing and have infrastructure to perform processing tasks without external cable connections. For example, a typical portable information handling system integrates in a portable housing a battery to power processing components, a display to present visual information as visual images and input/output (I/O) devices to support end user interactions with information. In convertible or clamshell configurations, portable information handling systems typically include a keyboard in a base housing portion and a display in a lid housing portion. The base and lid housing portions rotationally couple to each other to rotate between a closed configuration that provides portability and an open configuration in which the base holds the lid in a viewing position so that the display in the lid portion is held perpendicular to and above a keyboard in the base portion after approximately 90 degrees of rotation. Convertible information handling systems support 360 degrees of rotation so that the display rotates to a tablet configuration having the keyboard rotated under the system and acting as a base. A full 360 degrees of rotation typically uses a dual axis hinge so that the housing portions rotate about the height of the housing.

One difficulty with rotationally coupling housing portions by a dual axis hinge is that synchronizing gears within the hinge tend to add some vertical height to the information handling system. In order for a dual axis hinge to support repeated cycles between closed and open positions, robust hinge axis and gear components are included that will sustain repeated torsional forces. In addition, in order to support communication of information between housing portions, hinges that rotationally couple housing portions typically have to support cables that pass between the housing portions, such as a graphics cable that communicates pixel values from a graphics controller to a display or an antenna cable that passes radiofrequency signals from wireless radios in the main housing portion to antenna in the lid housing portion.

Generally, portable information handling system hinges have a mono-barrel "3-knuckle" configuration or a separated "5-knuckle" configuration. The mono-barrel configuration includes a barrel that interconnects two hinges. The barrel tends to provide additional robustness against torsional forces. The separated configuration has separate hinges with space between them so the hinges operate separately from each other. Typically, portable information handling systems that have a thin vertical profile rely on 5-knuckle hinge configurations. With thin profile housing portions, mono-barrel hinges typically do not leave sufficient room outside of the hinge to route cables. The mono-barrel restricts the ability to pass cables through a central part of the housings, while the separate hinges of the 5-knuckle configuration provide room to route cables between the hinges. Miniaturized mono-barrel hinges tend to restrict cable pathways to the outside of the hinges in a restricted area so that the cables are susceptible to damage during hinge movement.

SUMMARY OF THE INVENTION

Therefore, a need has arisen for a system and method which passes cables through a mono-barrel hinge.

In accordance with the present invention, a system and method are provided which substantially reduce the disadvantages and problems associated with previous methods and systems that pass cables through a mono-barrel hinge. Channels formed in dual parallel axles of a hinge route cables between rotationally coupled housing portions. A pair of hinges coupled to opposing ends of a centrally-disposed barrel support cable route from distal the barrel and through the channels to pass between channels proximate to the barrel in a protected manner.

More specifically, an information handling system processes information with processing components disposed in rotationally-coupled housing portions. For example, a processor, memory and graphics processor disposed in a main housing portion cooperate to execute an application that generates visual information for communication as pixel information to a display in a lid housing portion. A graphics cable communicates the pixel information from the graphics card to the display by traversing across the housing portions near a hinge that rotationally couples the housing portions to each other. The hinge assembles to a mono-barrel hinge assembly having a barrel disposed on opposing sides of first and second dual axis hinges. Each axle of each dual axis hinge includes a cable channel and a guide portion to guide the graphics cable from the main housing portion to the lid housing portion. The cable enters the channel of a first axle to the outside of the mono-barrel hinge assembly, passes across the guide portion proximate a gear of the mono-barrel hinge assembly, then routes out the channel of a parallel second axis by traveling away from the gear. The channel within each hinge axle protects the cable from damage during rotation of the hinge between closed and open configurations.

The present invention provides a number of important technical advantages. One example of an important technical advantage is that a mono-barrel hinge provides a channel integrated in the hinge axles to pass cables between coupled housing portions in a manner that protects the cables from binding or physical damage. Cable routing starts with entry of the cable to an axle channel distal the mono-barrel so that the cable is held stabilized within the channel to an exit proximate the mono-barrel. The cable crosses the hinge proximate the barrel to a channel of the parallel axle where it travels in a controlled manner down the channel to exit distal the mono-barrel. Cable management integrated with channels of a dual axis hinge offers controlled cable disposition with movement of any free cable portions minimized so that cable routing from the outer perimeter of the information handling system is supported with mom-barrel hinges in a reduced vertical footprint similar to that achieved in separate hinge configurations.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

An information handling system rotationally couples housing portions with a mono-barrel hinge having cables routed through hinge axle channels to provide reduced vertical height and robust hinge rotation and cable protection. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1A:
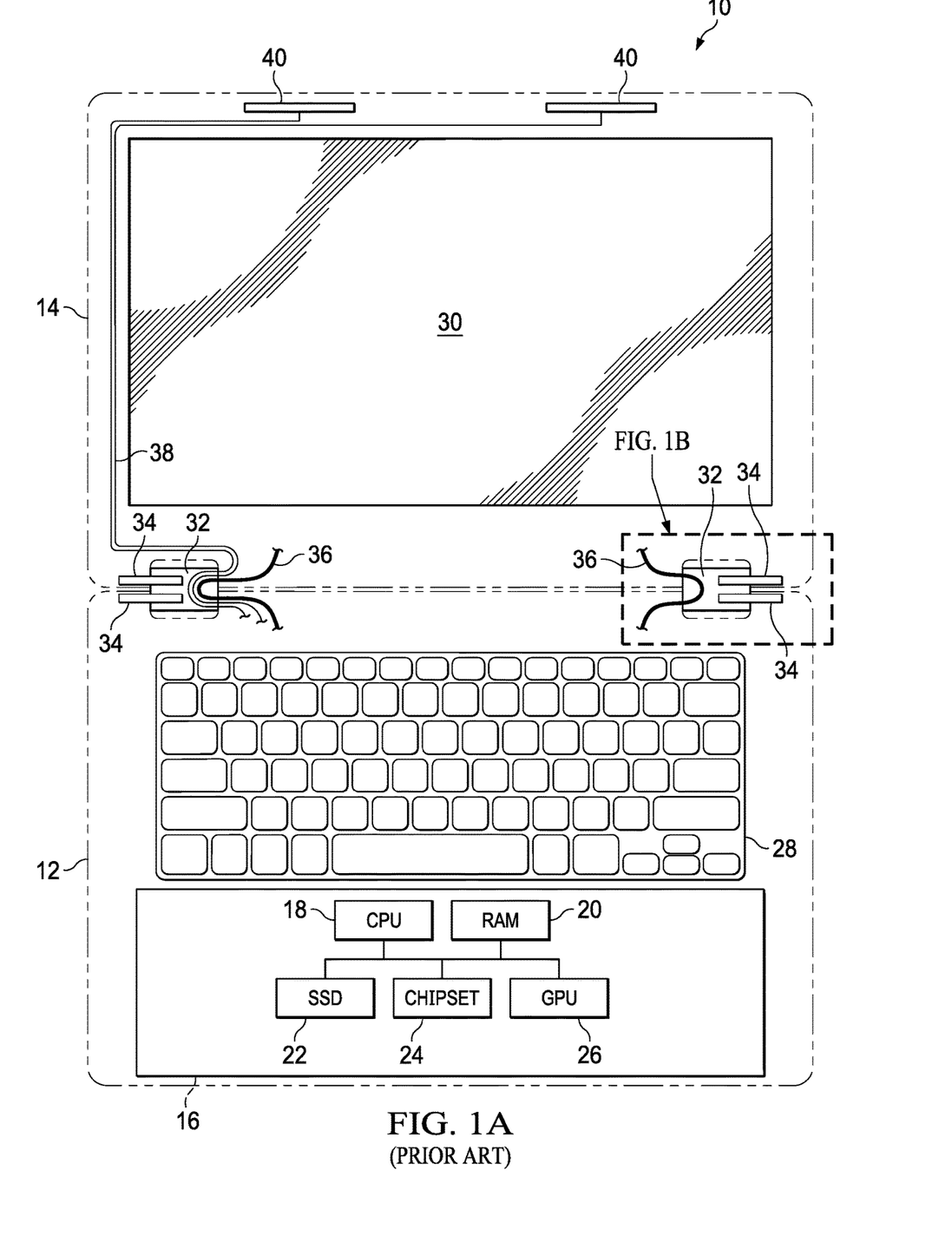
FIGS. 1A and 1B, generally referred to as FIG. 1, depict a prior art portable information handling system having a separate hinge configuration with cables traversing the housing portions between the hinges.
Figure 1B:
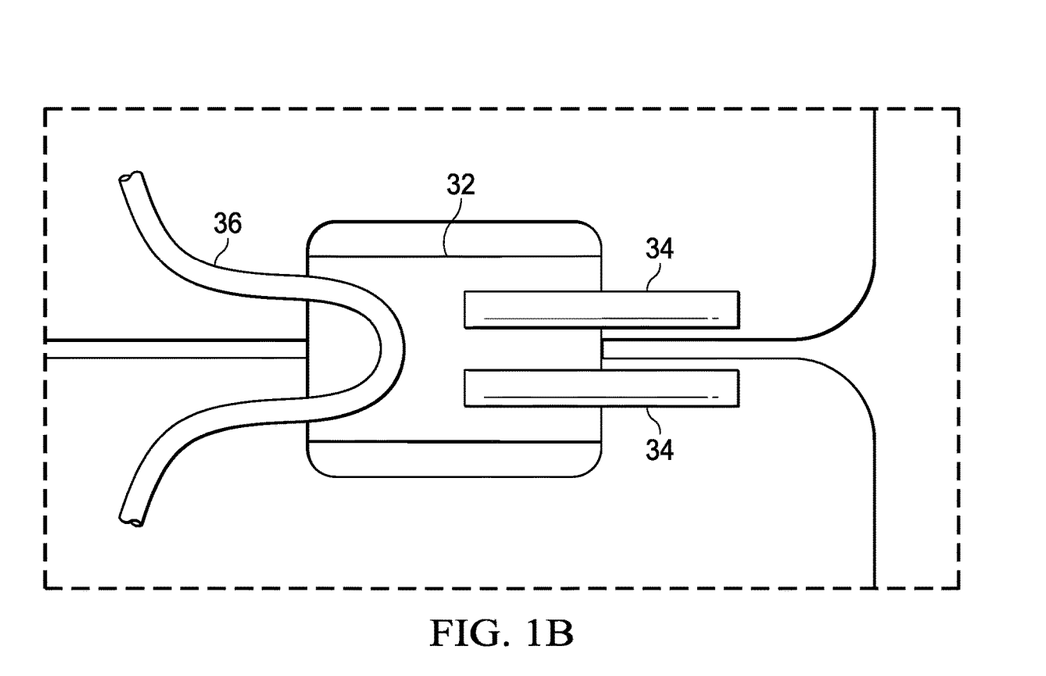

Referring now to FIG. 1, a prior art portable information handling system 10 is depicted having a separate hinge 32 configuration with cables 36 and 38 traversing the housing portions 12 and 14 between the hinges 32. Portable information handling system 10 has a convertible configuration with a main housing portion 12 rotationally-coupled to a lid housing portion 14 by first and second hinges 32. Main housing portion 12 contains processing components that cooperate to process information. In the example embodiment, a motherboard 16 interfaces a central processing unit (CPU) 18 and random access memory (RAM) 20 that cooperate to execute instructions that process information. For instance, CPU 18 retrieves an operating system and applications from persistent memory of a solid state drive (SSD) 22 to create visual information that an end user interacts with. A chipset 24 coordinates CPU 18 interactions with input/output (I/O) devices, such as by providing visual information to a graphics processing unit (GPU) 26, which processes the visual information into pixel values for presentation at a display 30. In the example embodiment, a keyboard 28 cover the processing components and accepts end user inputs. In addition, display 30 my accept touch inputs, such as by rotating 360 degrees to a tablet configuration.

Figure 2A:
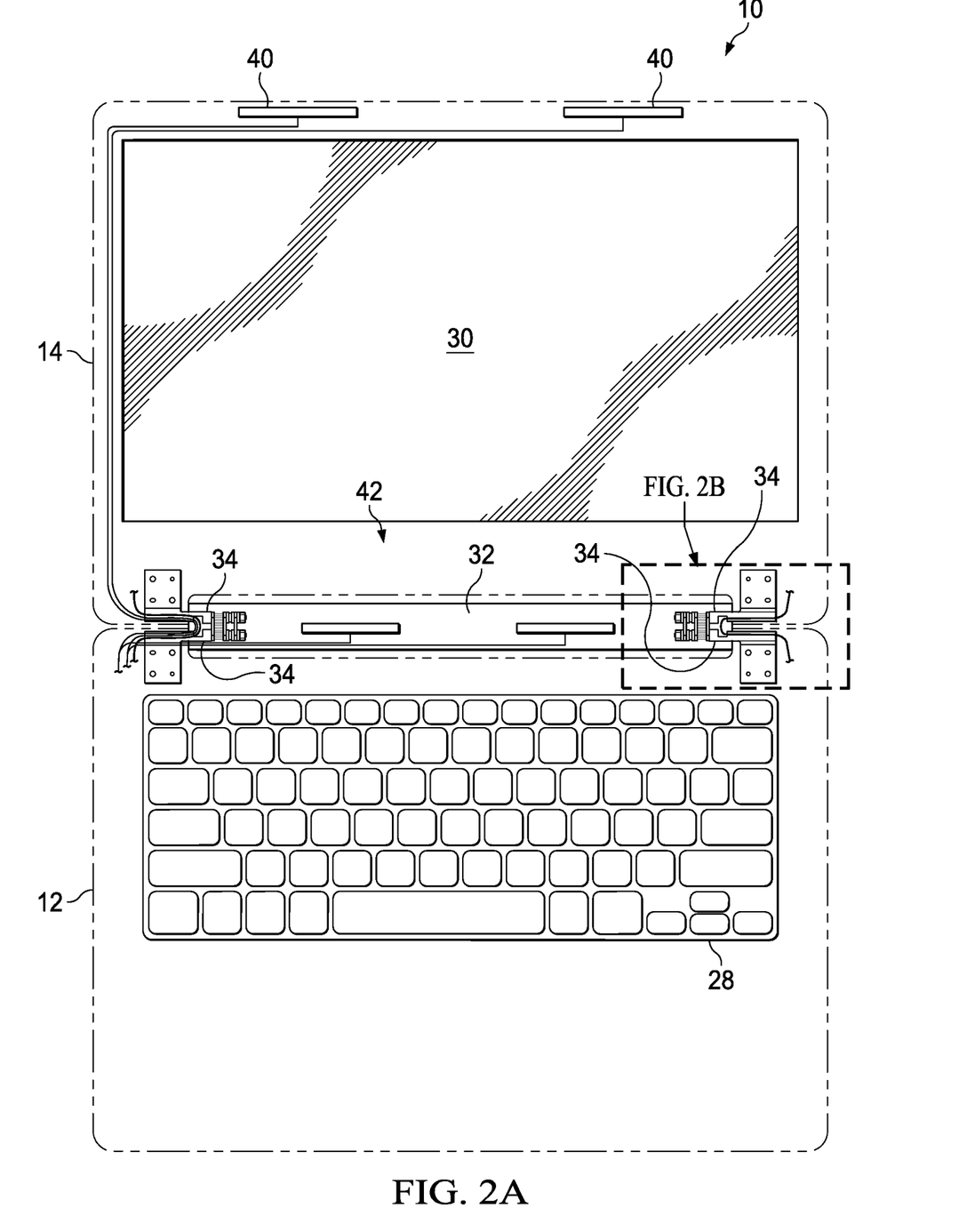
FIGS. 2A and 2B, generally referred to as FIG. 2, depict a portable information handling system having a mono-barrel hinge with cables routed through hinge axle channels to the outside of the hinge assembly.
Figure 2B:
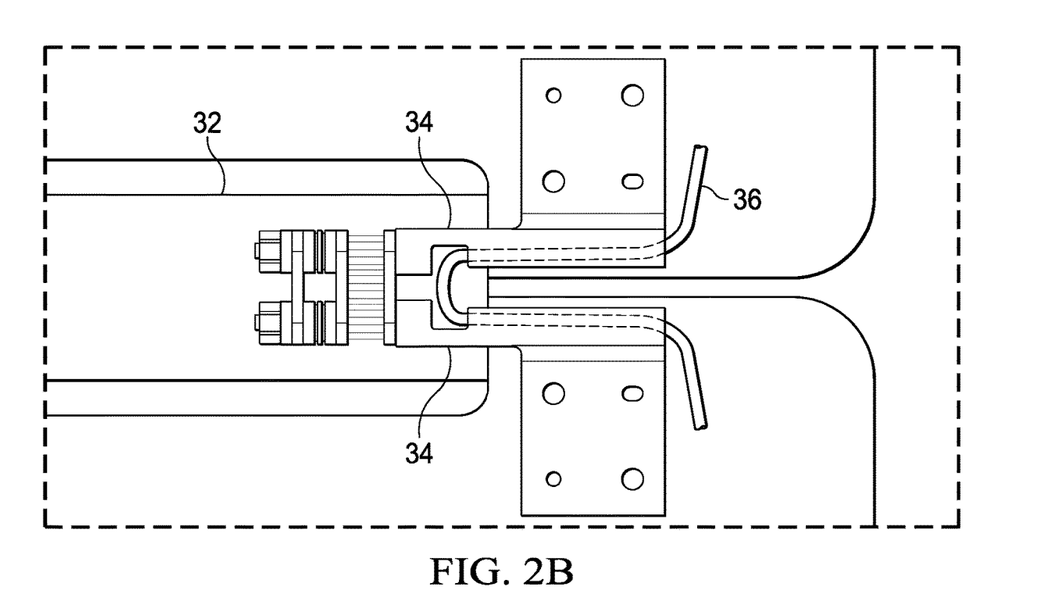

Referring now to FIG. 2, a portable information handling system 10 is depicted having a mono-barrel hinge assembly 42 with cables 36 and 38 routed through hinge axle channels to the outside of the hinge assembly. In FIG. 1, information handling system 10 has free space between the separate hinges 32 so that cables may route from a starting point located between the hinges 32, then through the protected area defined by each hinge 32, then out to a destination located between the hinges 32. In contrast, with the mono-barrel hinge assembly 42 of FIG. 2, the central barrel 42 couples to each individual hinge 32 so that no room is available for routing cables between the two hinges 32. In the example embodiment, each hinge 32 is a dual axle hinge synchronized by a gear assembly located on the inner portion of each hinge 32 while a connection plate connected to the outer portion of each axle couples the hinge 32 to the housing portions. As shown in FIG. 1B, routing a graphics cable 36 and an RF coaxial cable 38 near the gear portion of each hinge 32 instead of the axles 34 provides a protected space for cables 36 and 38. In contrast, as shown by FIG. 2B, cable travel at the outside of the housing portions risks cable binding at rotating axles 32, especially in low profile housings where little room is provided for cable routing. Although the example embodiment in FIG. 2 illustrates cable routing through a dual axis hinge, in one example embodiment similar routing may be supported with a one axis hinge configuration having two single axis hinges connected with a mono-barrel. For instance, a cable channel formed in the single axles has sufficient diameter to route the cable both towards and away from the mono-barrel. The cable routing provides a secure and protected path that manages cable position and protection during rotation of housing portions. Alternatively, cable routing may proceed through the hinge axle channel and into the mono barrel to exit through a second hinge axle channel at an opposing end of the mono barrel. In various embodiments, different types of cable routing may be supported in both single and dual axis hinges that provide less than 360 degrees of rotation. For instance, where housing portions rotate only between closed and clamshell configurations, such as a limit of approximately 135 degrees of rotation, less risk of cable binding exists so that single or dual axle cable channel routing may take various formats.

Figure 3:
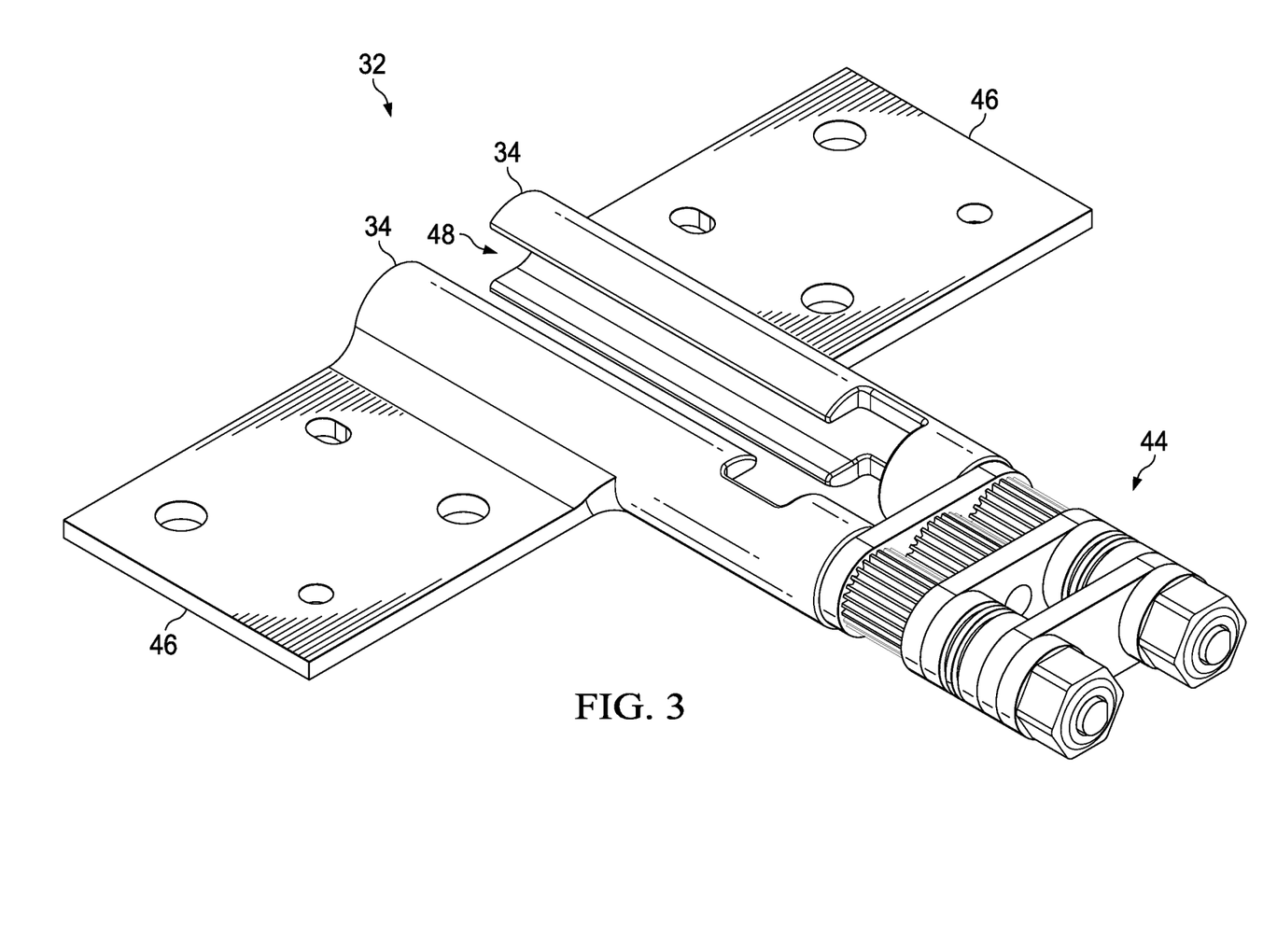
FIG. 3 depicts a side perspective view of a portable information handling system dual axis hinge having integrated cable channels.
Figure 4:
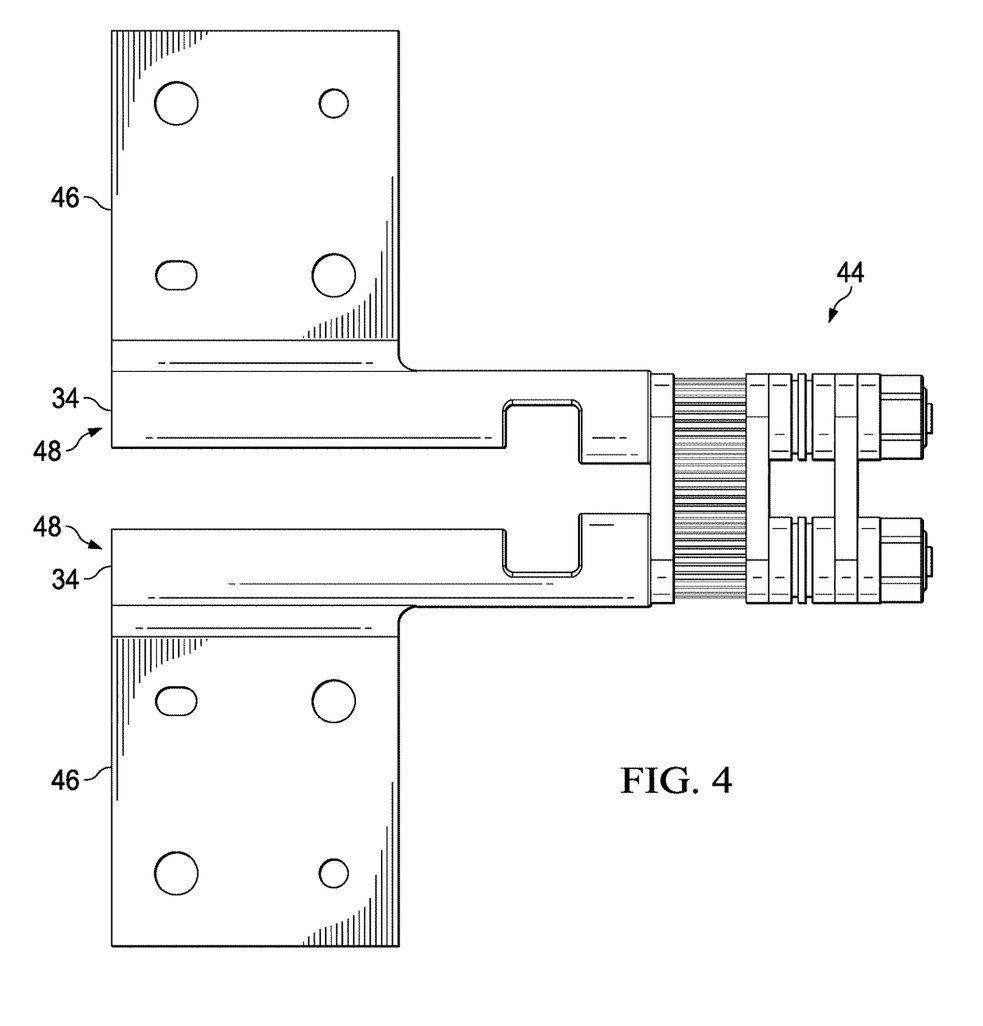
FIG. 4 depicts a top view of a portable information handling system dual axis hinge having in integrated cable channels.

Referring now to FIG. 3, a side perspective view depicts a portable information handling system dual axis hinge 32 having integrated cable channels 48. FIG. 4 depicts a top view of the portable information handling system dual axis hinge 32 having integrated cable channels 48. In the example embodiment, cable channels 48 run along each axle 34 from the connection plate 46 to the gear assembly 44. Each cable channel is sized to accept a cable that inserts at a connection plate 46 to run through the channel to a location proximate gear assembly 44 where the cable crosses to the parallel axle 34 channel 48 to run out to that connection plate 46. In the example embodiment, a guide formed proximate gear assembly 44 helps to maintain a cable on its intended routing during rotation of hinge 32. In addition, axles 34 include additional material along axles 34 that resist torsional twisting forces, such as related to the reduce axle material where the channel is formed.

Figure 5:
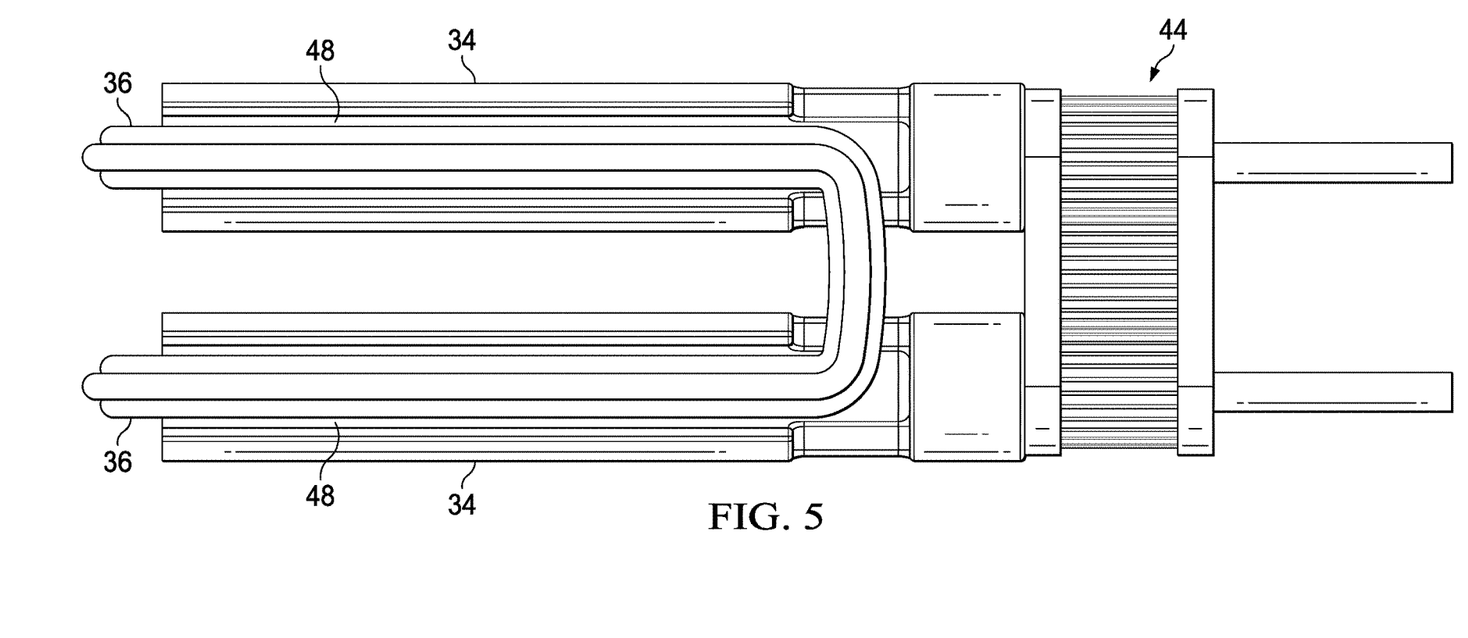
FIG. 5 depicts a front side view of a dual axis hinge having cables routed through integrated cable channels.
Figure 6:
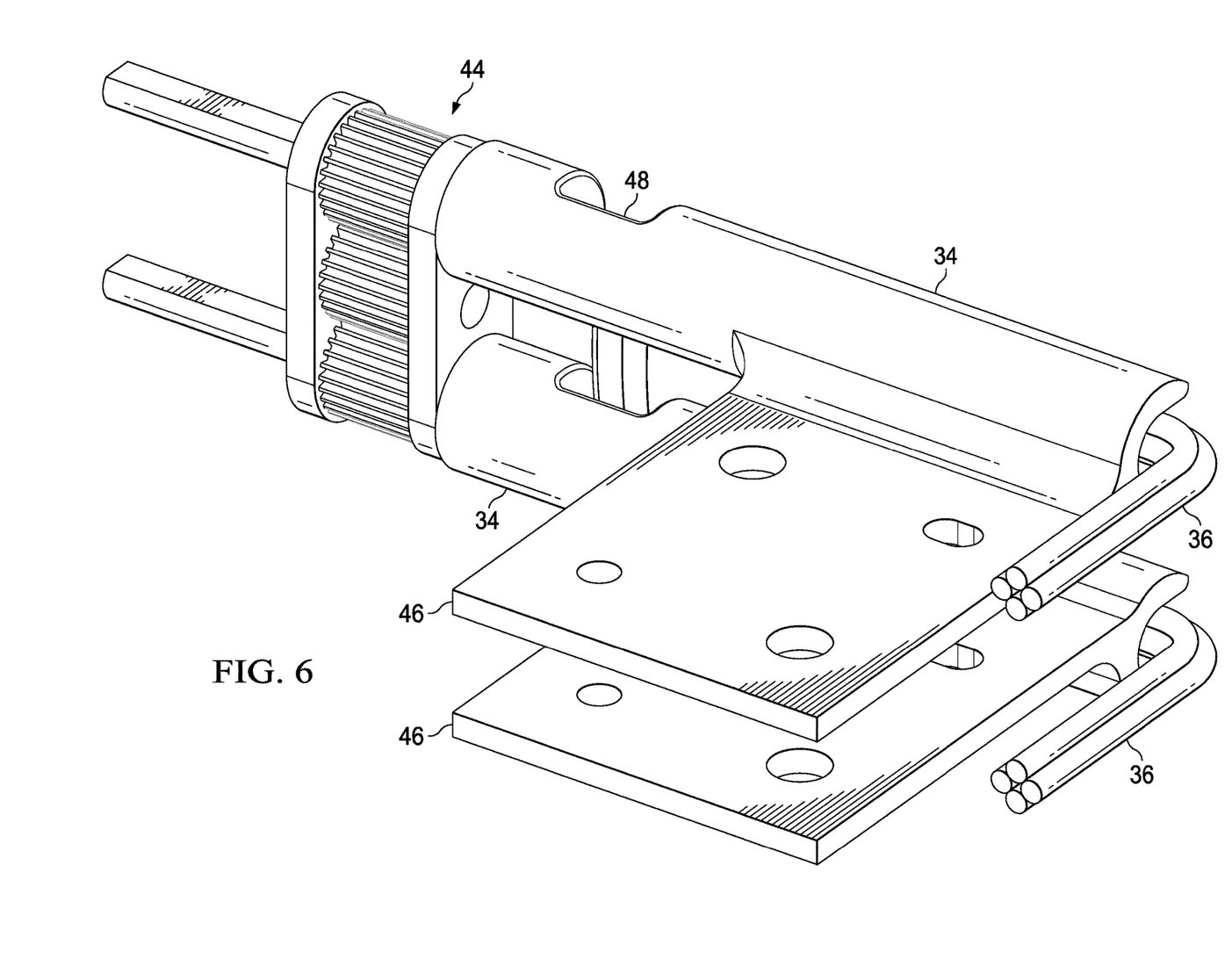
FIG. 6 depicts a rear side perspective view of a dual axis hinge having integrated cable channels.

Referring now to FIG. 5, a front side view depicts a dual axis hinge 32 having a cable 36 routed through an integrated cable channel 48. FIG. 6 depicts a rear side perspective view of the dual axis hinge 32 having the integrated cable channels 48. Each channel 48 provides room to route cable 36 within axle 34 and a guide portion of each axle 34 proximate gear assembly 44 routes cable 36 between axles 34. As hinge 32 rotates, axles 34 remain parallel to each other and rotate about cable 36 so that cable 36 is protected from damage and binding. The guide portion of each axle 34 proximate gear assembly 44 provides room for a full 360 degrees of rotation of hinge 32 with each axle 34 avoiding contact against cable 36 at the crossover location during the rotation. In one embodiment, each axle 34 has torsional reinforcement in the form of additional material added at the coupling of connection plate 46 to each axle 34. In an alternative example embodiment, a cover may be placed over top of channel 48 after installation of cable 36 to hold cable 36 in place and add torsional support against twisting that occurs during hinge 32 rotation.

Figure 7:
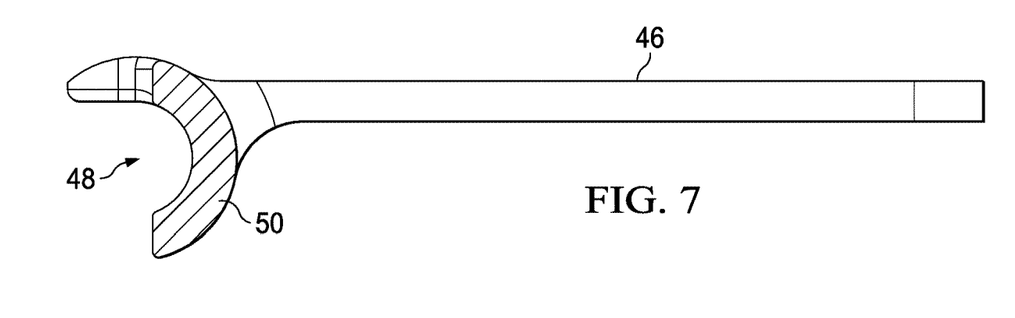
FIG. 7 depicts a side cutaway view of a hinge axle having an integrated cable channel with reinforced torsional support.

Referring now to FIG. 7, a side cutaway view depicts a hinge axle 34 having an integrated cable channel 48 with reinforced torsional support 50. In the example embodiment, formation of cable channel 48 about a central axis distributes material across an arc that defines a relatively large moment of inertia to increase mechanical strength against torsional forces. Connection plate 46 couples to axle 34 at the high moment of inertia cross section 50 to add structural support against torsional twisting during hinge rotation. For example, connection plate 46 welds to axle 34 to add material along the support axis and further resist twisting.

Figure 8A:
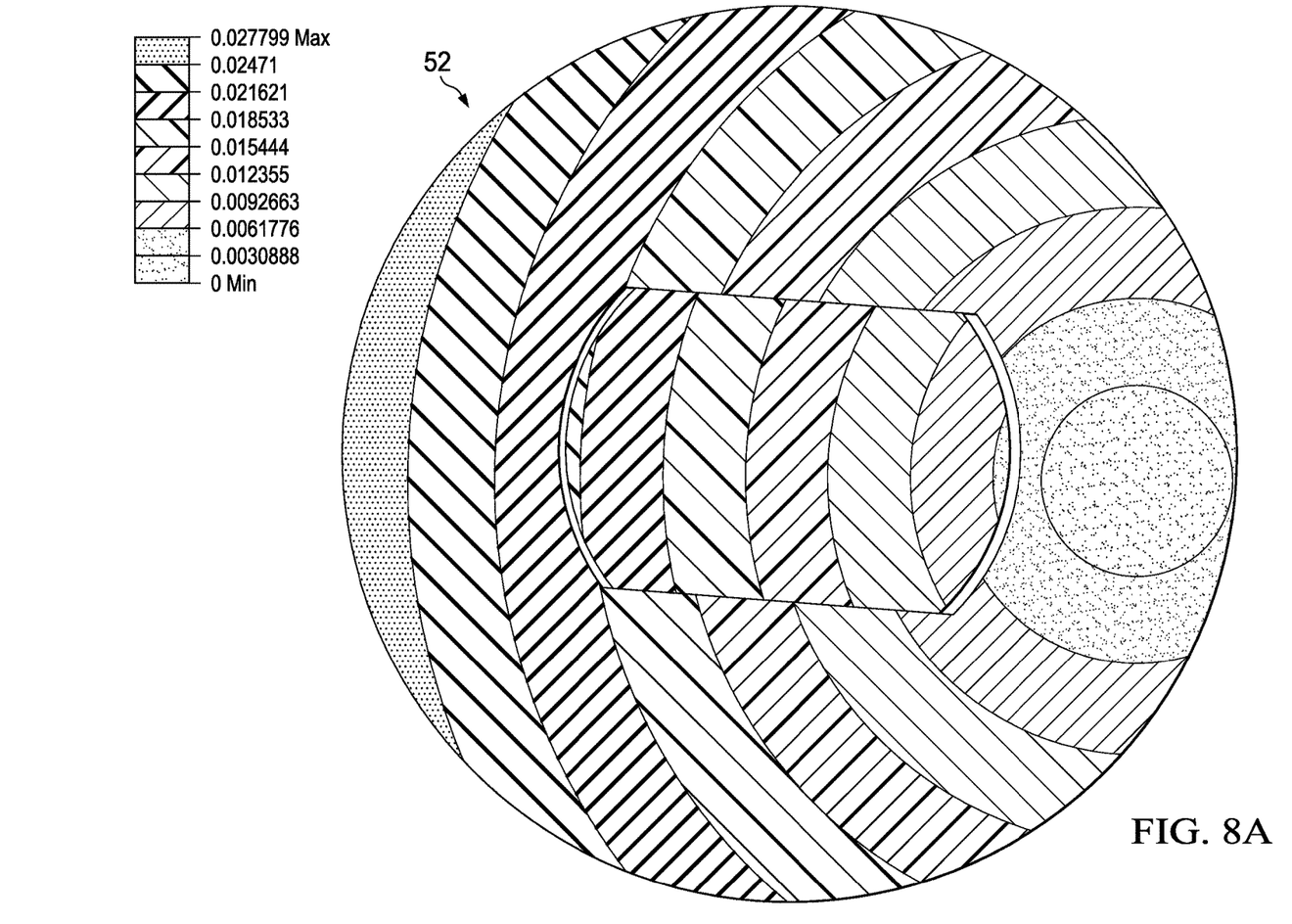
FIGS. 8A and 8B, generally referred to as FIG. 8, depict a side perspective view of a hinge axle having an integrated cable channel and twist generated by an example torque.
Figure 8B:
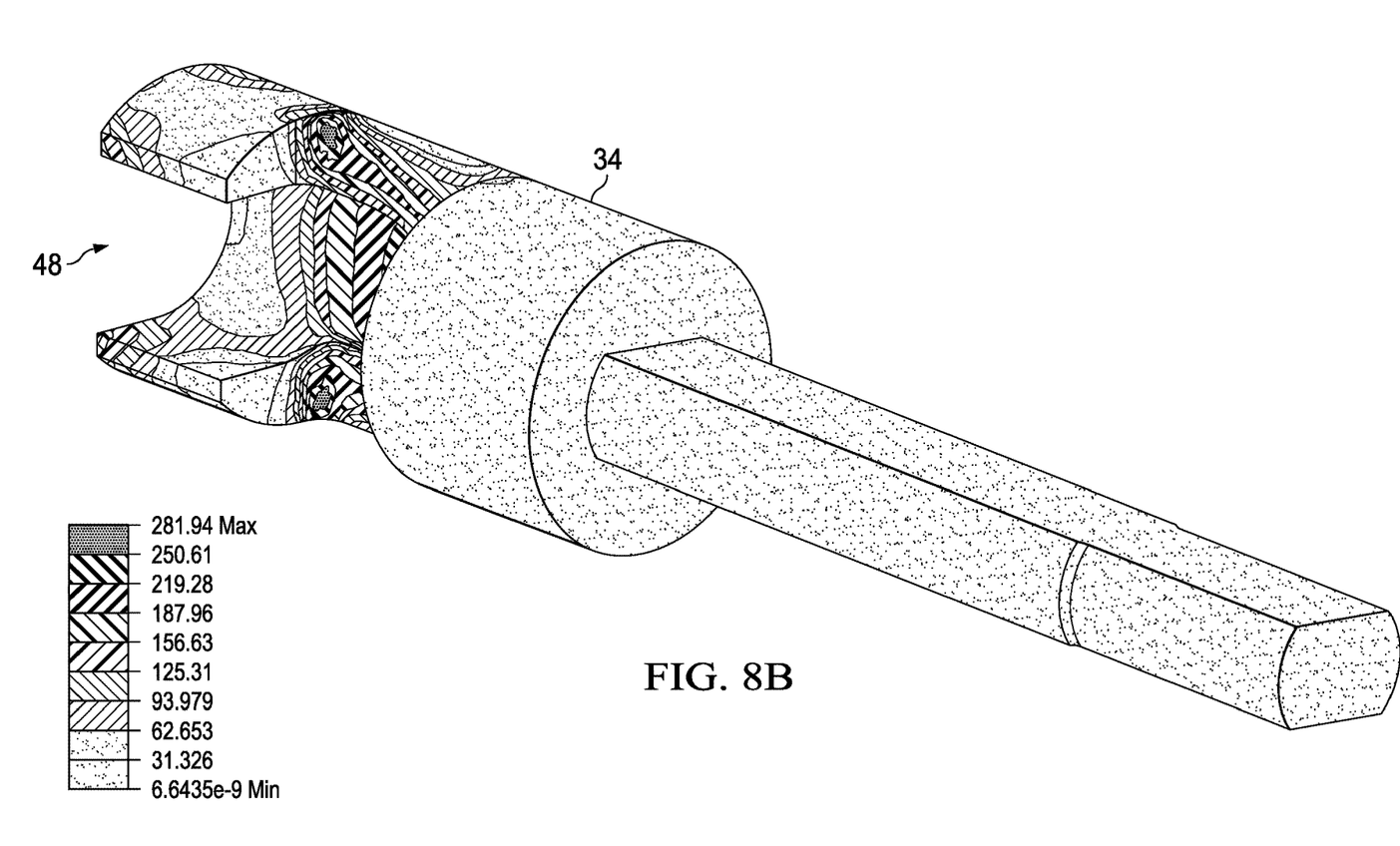

Referring now to FIG. 8, a side perspective view depicts a hinge axle 34 having an integrated cable channel 48 and twist generated by an example torque. Each individual axle 34 is formed to integrate a gear and guide portion that assembles into the gear assembly 44. Rotation of a hinge 32 introduces torsional force to an axle 34 resulting in some twisting. In the example embodiment, a 6.6 kg-cm torque produces approximately 0.33 degrees of twist in axle 34. The amount of twist is managed by defining the size of the high moment of inertia cross section 50 and material thickness for anticipated force. In addition, adjustment of torque provided by friction members within a hinge 32 may reduce torsional forces where low system weight calls for less torque to maintain housing portions in a desired rotational alignment. In low Z-height systems, including cable channels 48 in hinge axles 34 provide efficient cable routing with a monorail hinge configuration while maintaining robust hinge construction to resist torsional damage over repeated closing and opening hinge cycles.

Although the present invention has been described in detail, it should be understood that various changes, substitutions and alterations can be made hereto without departing from the spirit and scope of the invention as defined by the appended claims.

What is claimed is:

1. An information handling system comprising:
a main housing portion;
a lid housing portion;
processing components disposed in the main housing portion that cooperate to process information;
a hinge rotationally coupling the main and lid housing portions, the hinge having first and second parallel axles coupled to each other by a synchronizing mechanism, the first and second axles each having an internal channel, the internal channel having an opening extending along one side between the synchronizing mechanism and an end of each axle, the opening formed to have a larger size proximate the synchronizing mechanism than at the end, the larger size providing for passage of a cable across the parallel axels, the hinge further having a connection plate coupled to each axle opposite the opening for coupling to the main housing portion or lid housing portion; and
a cable interfaced with the processing components in the main housing portion and routing through the hinge first and second channels to the lid housing portion.

2. The information handling system of claim 1 further comprising:
first and second hinges rotationally coupling the main and lid housing portions, each hinge having first and second parallel axles coupled to each other by a synchronizing mechanism, at least the first hinge having the first and second channels; and
a barrel coupling the first and second hinges to each other at the synchronizing mechanisms.

3. The information handling system of claim 2 wherein the cable comprises a graphics cable that connects a graphics controller in the main housing portion to a display in the lid housing portion.

4. The information handling system of claim 2 wherein the cable comprises an antenna cable that connects a radio in the main housing portion to a radio in the lid housing portion.

5. The information handling system of claim 2 wherein the second hinge has first and second channels formed in the first and second axles.

6. The information handling system of claim 2 wherein each hinge axle integrates with a connection plate, the connection plate joined to the axle with torsional reinforcement.

7. The information handling system of claim 2 wherein the first and second hinges rotate the main and lid housing portions 360 degrees relative to each other.

8. The information handling system of claim 2 wherein the synchronizing mechanisms comprise gears.

9. An information handling system hinge assembly comprising:
- first and second hinges;
- a barrel coupled at a first end to the first hinge and at a second end to the second hinge;
- first and second axles extending from each of the first and second hinges and away from the barrel, each of the first and second hinges coordinating orientation of the associated axles during rotation of the hinge assembly;
- a connection plate coupled to each axle and configured to couple to an information handling system housing; and
- a cable channel formed in each axle, each cable channel having an opening extending from the axle end opposite the barrel towards the barrel, the opening having a larger size proximate the barrel, the cable channel routing one or more cables from the opposite end towards the barrel, the one or more cables extending between the first and second axles at the opening larger size proximate the barrel.

10. The information handling system hinge of claim 9 further comprising a cable routed into the cable channel of the first axle distal the first hinge, through the cable channel of the first axle to exit proximate the first hinge and into the second axle cable channel proximate the first hinge.

11. The information handling system hinge of claim 10 wherein the cable further routes through the second axle cable channel from proximate the first hinge to exit the cable channel distal the first hinge.

12. The information handling system hinge of claim 11 wherein the cable comprises a graphics cable.

13. The information handling system hinge of claim 10 wherein the cable comprises a coaxial cable.

* * * * *